United States Patent
Gormley

(10) Patent No.: US 10,208,708 B2
(45) Date of Patent: Feb. 19, 2019

(54) TRANSLATING CASCADE HIDDEN BLOCKER DOOR THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 308 days.

(21) Appl. No.: 14/609,024

(22) Filed: Jan. 29, 2015

(65) Prior Publication Data

US 2016/0245228 A1 Aug. 25, 2016

(51) Int. Cl.
*F02K 1/62* (2006.01)
*F02K 1/70* (2006.01)
*F02K 1/72* (2006.01)
*F02K 1/76* (2006.01)

(52) U.S. Cl.
CPC ............... *F02K 1/625* (2013.01); *F02K 1/72* (2013.01); *F02K 1/763* (2013.01); *F05D 2260/50* (2013.01); *Y02T 50/671* (2013.01)

(58) Field of Classification Search
CPC ... F02K 1/70; F02K 1/72; F02K 1/763; F02K 1/54; F02K 1/56; F02K 1/62; F02K 1/625
See application file for complete search history.

(56) References Cited

U.S. PATENT DOCUMENTS

| | | | |
|---|---|---|---|
| 3,059,426 A * | 10/1962 | Laucher | F02K 1/625 239/265.31 |
| 3,347,467 A * | 10/1967 | Anton | F02K 1/04 239/265.13 |
| 3,511,055 A * | 5/1970 | Timms | F02K 1/72 239/265.29 |
| 3,621,763 A | 11/1971 | Geyer | |
| 3,829,020 A * | 8/1974 | Stearns | F02K 1/09 181/216 |
| 3,831,376 A | 8/1974 | Moorehead | |
| 4,278,220 A | 7/1981 | Johnston et al. | |
| 4,564,160 A | 1/1986 | Vermilye | |
| 4,807,434 A | 2/1989 | Jurich | |
| 4,909,442 A | 3/1990 | Fernz | |
| 5,228,641 A | 7/1993 | Remlaoui | |
| 5,309,711 A | 5/1994 | Matthias | |
| 5,927,647 A | 7/1999 | Masters | |
| 6,036,238 A | 3/2000 | Lallament | |
| 6,170,254 B1 | 1/2001 | Cariola | |

(Continued)

FOREIGN PATENT DOCUMENTS

| | | | |
|---|---|---|---|
| EP | 0801221 | 10/1997 | |
| FR | 2982323 | * 5/2013 | F02K 1/72 |

(Continued)

OTHER PUBLICATIONS

EP search report for EP16152997 dated Jun. 20, 2016.
SKYbrary, "Cascade Reverser", from SKYbrary Wiki, Dec. 9, 2013.

*Primary Examiner* — Andrew H Nguyen
(74) *Attorney, Agent, or Firm* — O'Shea Getz P.C.

(57) ABSTRACT

Aspects of the disclosure are directed to a thrust reverser system of an aircraft comprising: a translating cascade sleeve, a blocker door, and a kinematic mechanism configured to actuate the blocker door, the kinematic mechanism comprising: a first link coupled to the translating cascade sleeve, a second link coupled to the first link and a fixed structure, and a third link coupled to the first link and the blocker door.

18 Claims, 8 Drawing Sheets

(56) References Cited

U.S. PATENT DOCUMENTS

| | | | |
|---|---|---|---|
| 6,340,135 B1 | 1/2002 | Barton | |
| 6,584,763 B2 | 7/2003 | Lymons | |
| 6,824,101 B2 * | 11/2004 | Sternberger | F02K 1/72 |
| | | | 239/265.19 |
| 6,845,946 B2 | 1/2005 | Lair | |
| 6,895,742 B2 | 5/2005 | Lair | |
| 7,146,796 B2 | 12/2006 | Lair | |
| 7,264,203 B2 | 9/2007 | Lair | |
| 7,513,101 B2 | 4/2009 | Eschborn | |
| 8,109,466 B2 | 2/2012 | Aten | |
| 8,615,982 B2 | 12/2013 | Sundstrom | |
| 2010/0270428 A1 | 10/2010 | Murphy | |
| 2011/0062279 A1 | 3/2011 | Welch | |
| 2011/0167790 A1 | 7/2011 | Cloft | |
| 2012/0187214 A1 | 7/2012 | Welch | |
| 2013/0075492 A1 | 3/2013 | Welch | |
| 2013/0160425 A1 | 6/2013 | Scanlon | |
| 2013/0186219 A1 | 7/2013 | Jones | |
| 2013/0205753 A1 * | 8/2013 | Todorovic | F02K 3/025 |
| | | | 60/226.2 |
| 2013/0284822 A1 | 10/2013 | Howarth | |
| 2016/0160799 A1 | 6/2016 | Gormley | |

FOREIGN PATENT DOCUMENTS

| | | | | |
|---|---|---|---|---|
| GB | 2156004 A | * | 10/1985 | F02K 1/625 |
| WO | WO 2012010774 | * | 1/2012 | F02K 1/72 |

* cited by examiner

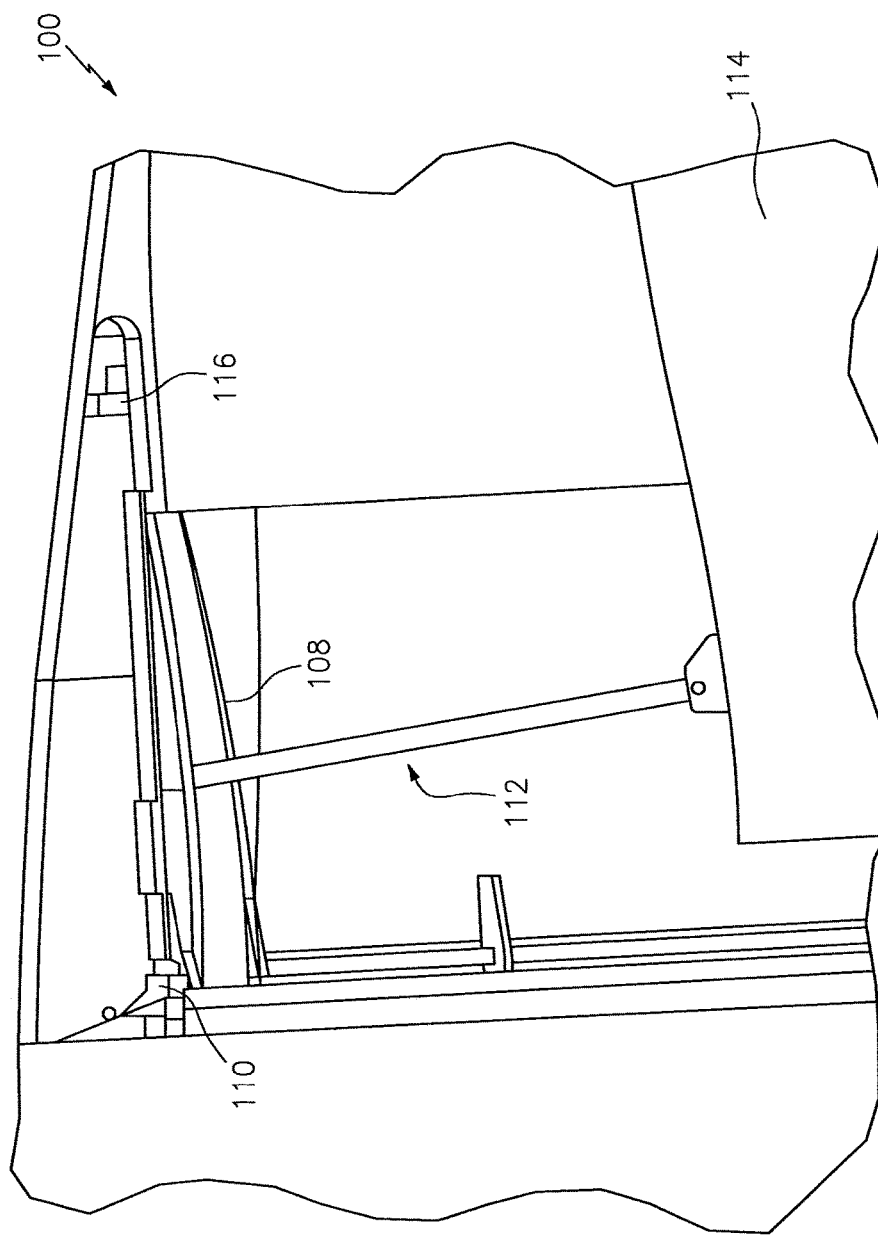

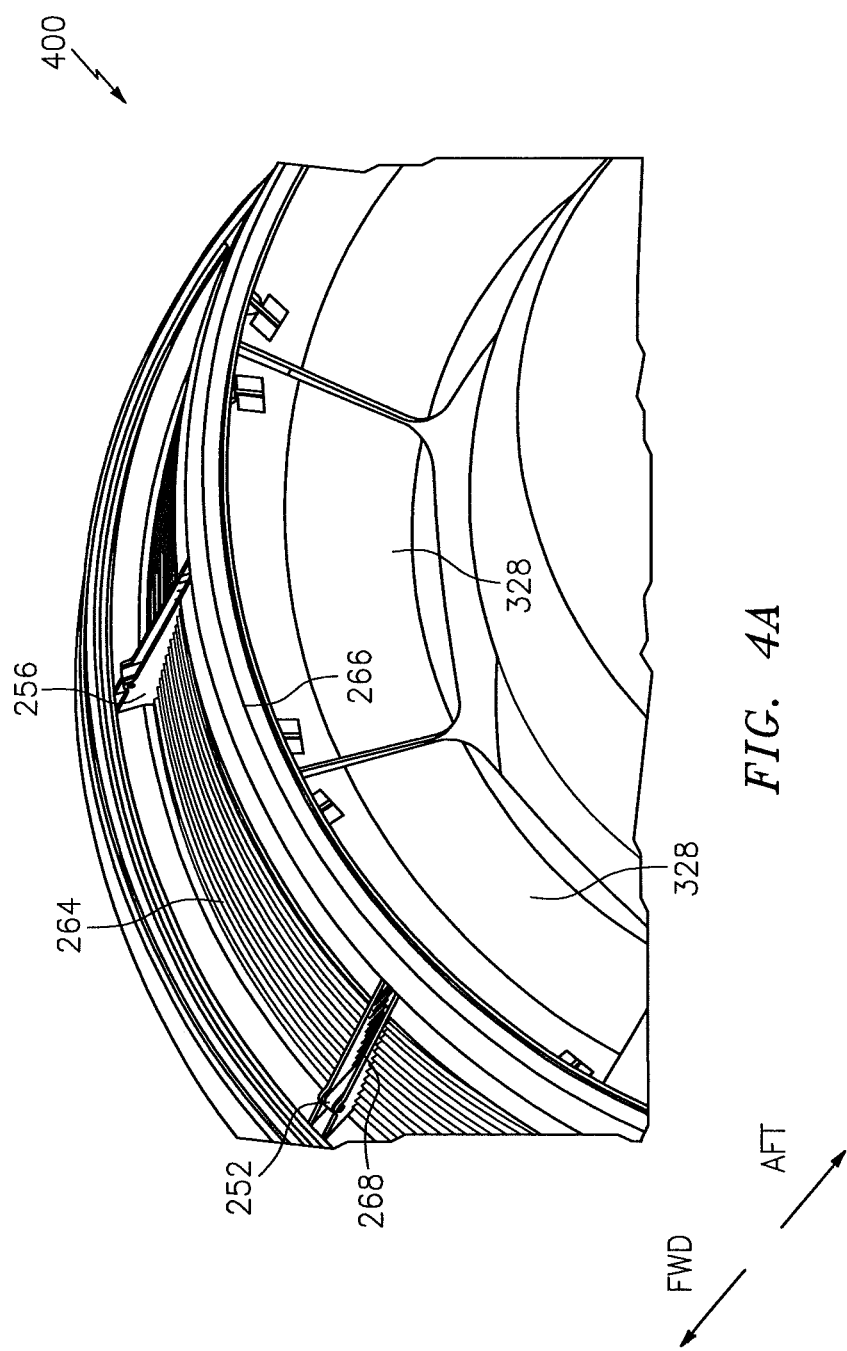

TRANSLATING CASCADE HIDDEN BLOCKER DOOR THRUST REVERSER

BACKGROUND

Within a turbofan engine that utilizes a cascade type thrust reverser, there are typically a plurality of blocker doors that deploy to redirect engine bypass air thru a set of cascades that turn the airflow out and forward in order to reverse the direction of the thrust of the engine. This is done to slow an aircraft after landing. Referring to FIG. 1A, a thrust reverser system 100 is shown. The system 100 includes a sleeve 102 that is translated or moved in, e.g., an aft direction in order to expose cascades 104 as part of the deployment of the thrust reverser. Similarly, in order to place the thrust reverser in a stowed state (e.g., during flight) the sleeve 102 is translated, e.g., moved in a forward (FWD) direction, such that the sleeve 102 may contact or abut a thrust reverser fixed structure 106. When in the stowed state, the cascades 104 are not exposed. FIG. 1C illustrates the system 100 in the stowed state. An entirety of a nacelle is shown in FIG. 1C, whereas a portion (e.g., a half) of the nacelle is shown in FIG. 1A.

The blocker doors described above are typically pivotally attached to the sleeve 102 within the thrust reverser. FIG. 1B illustrates a cross-section of the system 100 of FIG. 1A about the line A-A, wherein a blocker door 108 of the system 100 is hinged to the sleeve 102 near a point 110. Additionally, the door 108 is attached to the inner fixed structure 114 of the thrust reverser via a drag link 112 that retains the door 108 in position during normal flight as well as aids in the deployment of the door 108 during thrust reverse mode.

The drag link 112 lies within the flow of bypass air from the engine's fan and generates drag losses, resulting in degraded efficiencies. Any steps and gaps around the door 108 create aerodynamic disturbances that reduce efficiency.

Additionally, the space between the point 110 and an aft cascade ring 116 may define the region where the cascades 104 are located. The dimension or length of this space is typically fixed and is selected to accommodate approximately the same airflow through the nacelle when the thrust reverser is operated in the stowed state/mode or the thrust reverse state/mode. This dimension/length contributes to inefficiencies or drag.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a thrust reverser system of an aircraft comprising: a translating cascade sleeve, a blocker door, and a kinematic mechanism configured to actuate the blocker door, the kinematic mechanism comprising: a first link coupled to the translating cascade sleeve, a second link coupled to the first link and a fixed structure, and a third link coupled to the first link and the blocker door. In some embodiments, the blocker door is hinged to the translating cascade sleeve. In some embodiments, the first link passes through a set of cascades via a slot created through the cascades irrespective of whether the thrust reverser system is operated in a stowed state or a deployed state. In some embodiments, loads experienced by the blocker door are translated through the third link and the first link to the translating cascade sleeve. In some embodiments, the thrust reverser system further comprises a plurality of ribs, wherein the loads are translated from the translating cascade sleeve to the ribs in at least one of a forward direction or an aft direction. In some embodiments, the fixed structure includes a clevis and a pin. In some embodiments, the second link is configured to rotate in a single direction when the thrust reverser system transitions from a stowed state to a deployed state. In some embodiments, the thrust reverser system further comprises a primary sleeve. In some embodiments, the primary sleeve is configured to conceal the blocker door with respect to a bypass duct airflow path when the thrust reverser system operates in a stowed state. In some embodiments, the primary sleeve is configured to be actuated by a first actuation mechanism and wherein the translating cascade sleeve is configured to be actuated by a second actuation mechanism. In some embodiments, when the thrust reverser system is transitioning from a stowed state to a deployed state the first actuation mechanism is configured to displace the primary sleeve before the second actuation mechanism causes an actuation of the translating cascade sleeve. In some embodiments, the translating cascade sleeve is coupled to at least one of a hinge beam or a latch beam.

BRIEF DESCRIPTION OF THE DRAWINGS

The present disclosure is illustrated by way of example and not limited in the accompanying figures in which like reference numerals indicate similar elements.

FIG. 1B schematically illustrates a drag link of the system taken along the line A-A of FIG. 1A.

FIGS. 4A-4B illustrate perspective views of a thrust reverser system.

DETAILED DESCRIPTION

Figure 1A:
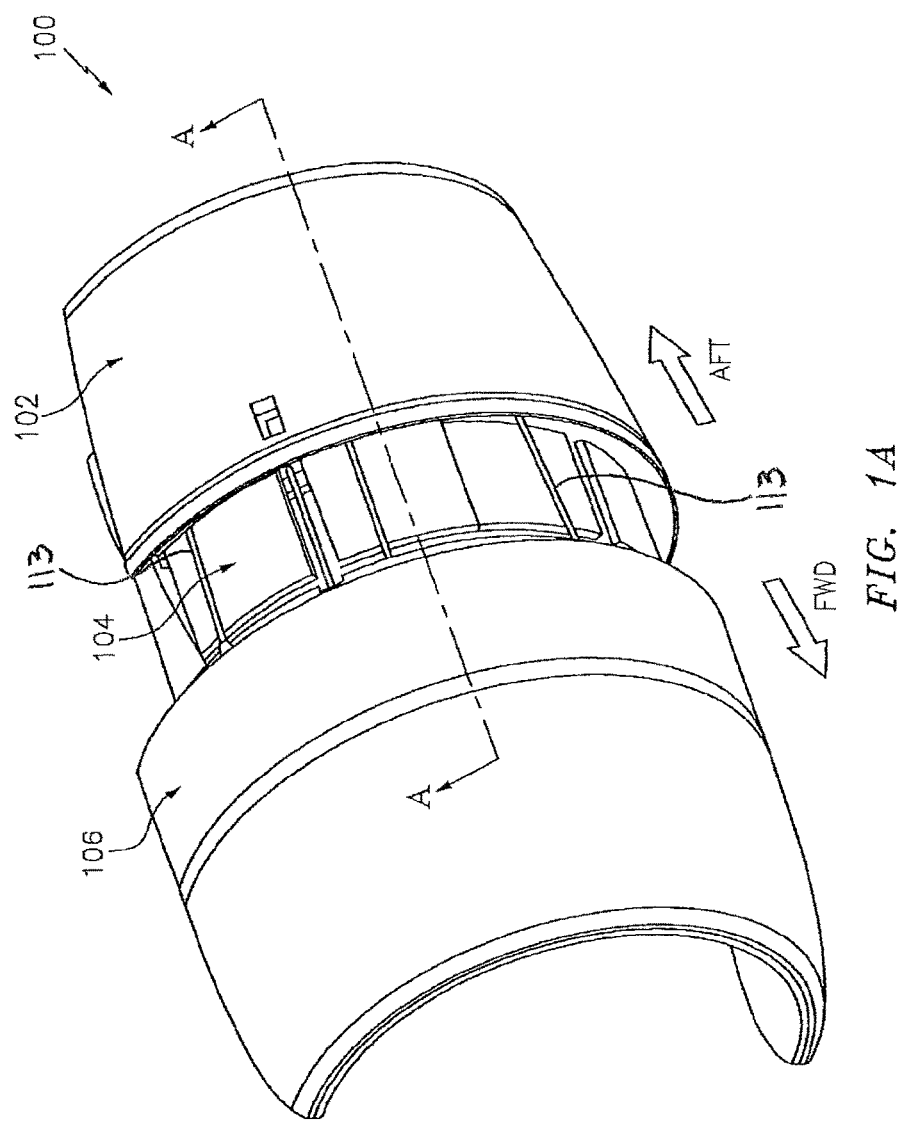
FIG. 1A schematically illustrates a thrust reverser system incorporating a translating sleeve.
Figure 1C:
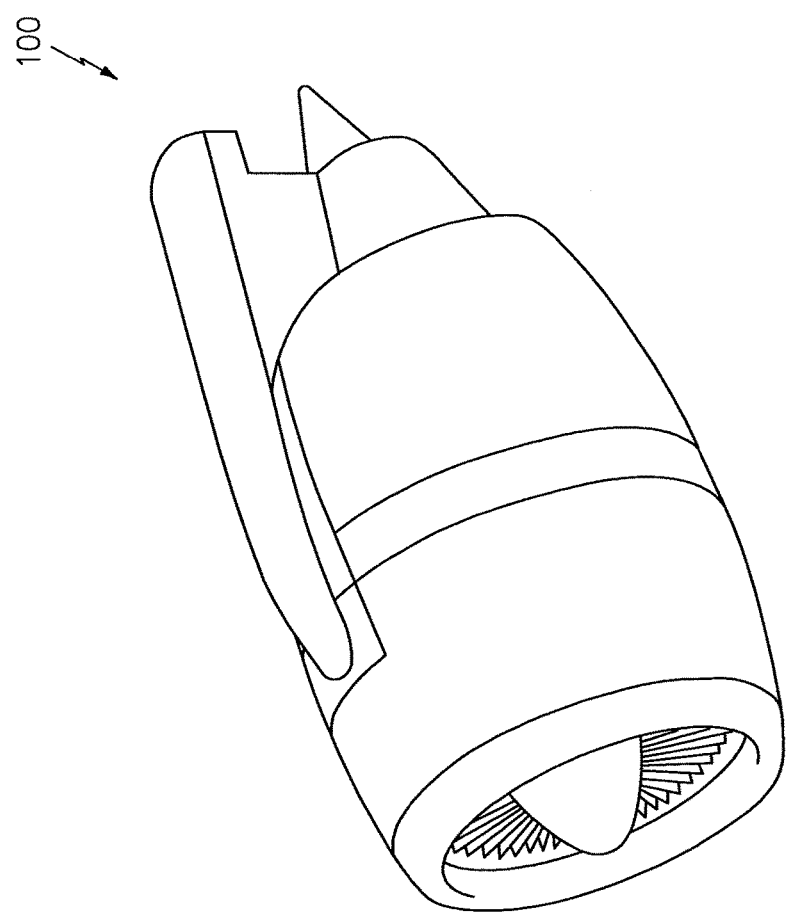
FIG. 1C illustrates a turbofan propulsion system with a nacelle incorporating a thrust reverser.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a translating cascade hidden blocker door thrust reverser. A separate cascade sleeve may be coupled (e.g., attached) to a hinge beam and a latch beam, potentially via a track and slider configuration as would be known to one of skill in the art. This separate sleeve can be operated at a different time and rate than a primary sleeve.

In some embodiments, a set of one or more blocker doors may be coupled (e.g., pivotally attached) to the translating cascading sleeve. The blocker doors may rotate into a bypass duct airflow path in order to guide a bypass airflow outward into the cascades. The blocker doors may be operated via one or more of the mechanisms (e.g., kinematic mechanisms) described herein, wherein one such mechanism may be included with/on the translating cascade sleeve and may be triggered/actuated by a link to a fixed structure. Modifications to the mechanism(s) may provide for customization in terms of deployment and transient area match.

In accordance with aspects of this disclosure, the blocker doors may be hidden/concealed by the primary sleeve, such that the shape of the blocker doors are not driven by loft lines and thus can be customized to obtain optimal flow characteristics/positions during thrust reverser deployment. By pivotally attaching the blocker door to the translating cascade sleeve, there is no need for a fixed aft cascade ring (e.g., the aft cascade ring 116 of FIG. 1B), enabling additional freedom for optimized aerodynamic surfaces. The quantity of the doors can also be customized since they are not constrained by loft.

Figure 2:
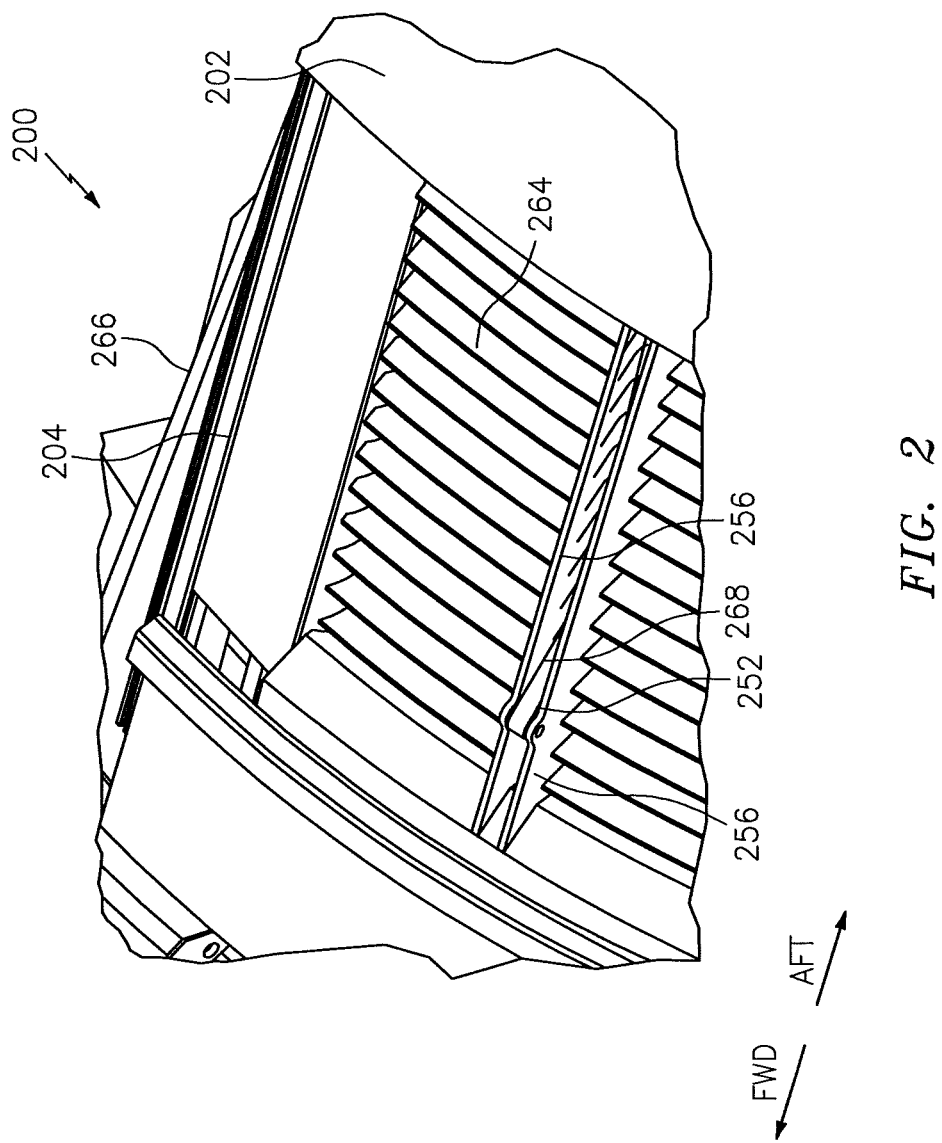
FIG. 2 illustrates a portion of a thrust reverser system in accordance with aspects of the disclosure.

Referring to FIG. 2, a portion of a thrust reverser system 200 is shown. The system 200 includes one or more primary sleeves 202 and one or more translating cascade sleeves/secondary sleeves 204. A portion of a link 252 (which is described in further detail below) is also shown in FIG. 2, where the link 252 is sandwiched or retained by ribs 256. The link 252 may pass-thru a set of cascades 264 via a slot 268 created through the cascades 264 (irrespective of whether the thrust reverser is operated in the stowed or deployed state). A pass-thru cascade sleeve formed via the link 252/slot 268 may be provided in a one-to-one relationship to a blocker door. In other words, there may be one pass-thru cascade sleeve per blocker door.

The primary sleeve 202 may be located in proximity to one or more beams 266 (e.g., a hinge beam or a latch beam). The translating cascade sleeve 204 may be shielded by the primary sleeve 202.

The translating cascade sleeve 204 may be circumferentially and radially constrained at the beam 266, similar to track-and-slider configurations as would be known to one of skill in the art.

Figure 3A:
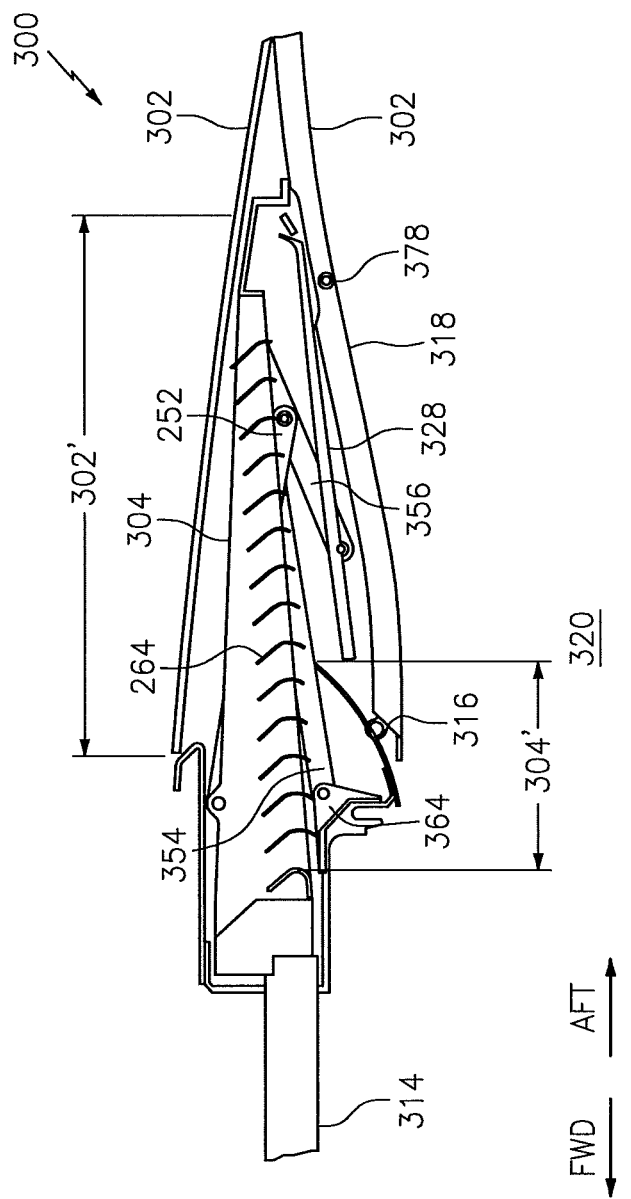
FIG. 3A illustrates a thrust reverser system incorporating a translating cascade sleeve and hidden blocker door in a stowed state in accordance with aspects of the disclosure.
Figure 3B:
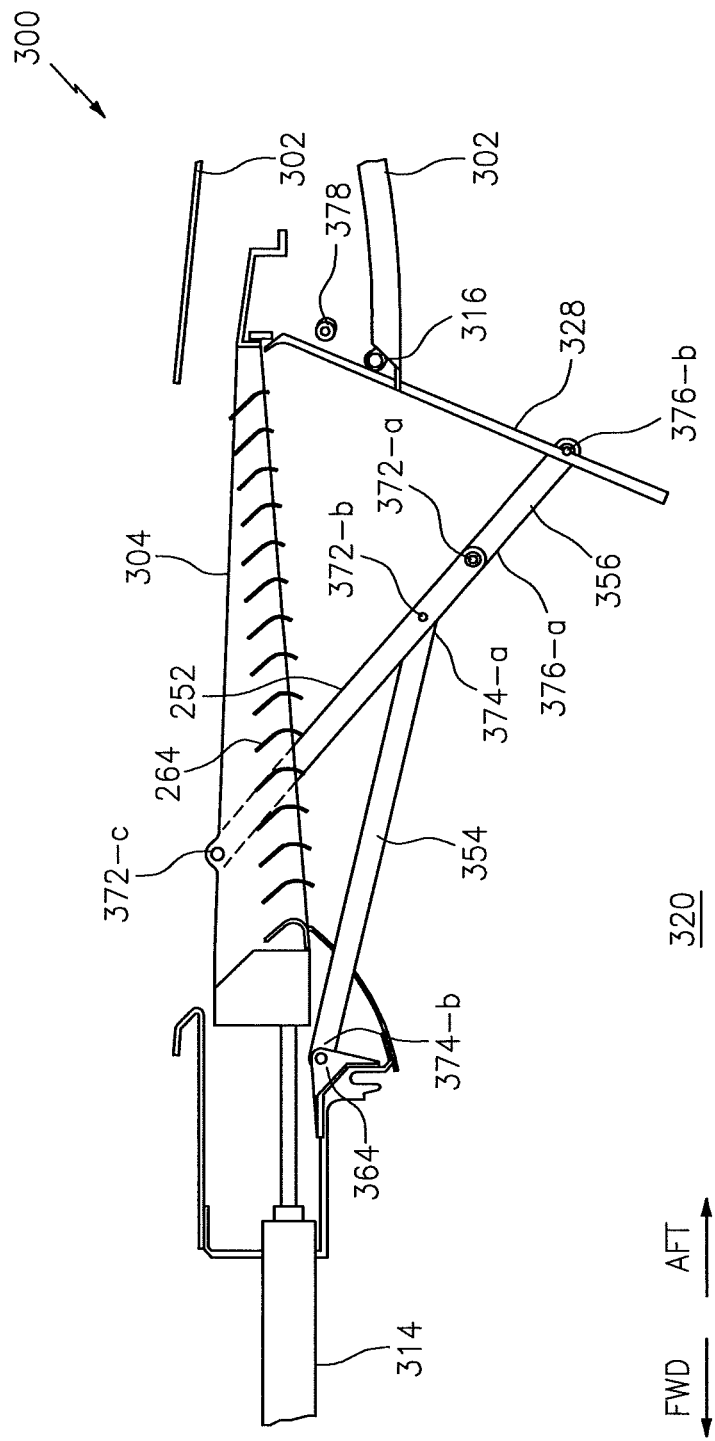
FIG. 3B illustrates the thrust reverser system of FIG. 3A when operating in a deployed state in accordance with aspects of the disclosure.

Referring now to FIGS. 3A-3B, a cross-section of a thrust reverser system 300 is shown (where the cross-section may be analogous to the cross-section about the line A-A of FIG. 1A). The system 300 may be associated with, or include, one or more of the components or devices of the system 200 of FIG. 2 described above.

The system 300 includes one or more primary sleeves 302 (which may correspond to the primary sleeve 202 of FIG. 2) and one or more translating cascade sleeves 304 (which may correspond to the translating cascade sleeve 204 of FIG. 2). Superimposed for reference purposes is a primary sleeve stroke 302' associated with the primary sleeve 302 and a cascade stroke 304' associated with the translating cascade sleeve 304. A stroke refers to the distance or displacement of a given element or a range over which the element may be displaced.

In some embodiments, the primary sleeve 302 and the translating cascade sleeve 304 may be driven by separate actuation mechanisms; e.g., actuator 113 (see FIG. 1A) and actuator 314 (see FIG. 3A) respectively. Alternatively, the primary sleeve 302 and the translating cascade sleeve 304 may be driven by a common actuator, potentially in a master-slave configuration (e.g., an actuation of a first of the sleeves, such as for example the primary sleeve 302, may cause an actuation of a second of the sleeves, such as for example the translating cascade sleeve 304). In some embodiments, the actuation may be obtained via a gearbox that potentially includes one or more gears (e.g., bevel gears).

As an illustrative example, an actuator 314 that may be used to drive the translating cascade sleeve 304 is shown in FIG. 3A. The actuators (e.g., actuator 314) that are used to drive the primary sleeve 302 or the translating cascade sleeve 304 may be configured to cause the primary sleeve 302 or the translating cascade sleeve 304 to operate in accordance with one or more predetermined parameters (e.g., mechanical timing parameters).

The system 300 includes a seal 316 that may be coupled to a portion of a structure 318 that defines a duct 320. The structure 318/duct surface may be configured to provide for optimal airflow and acoustics, and the seal 316 may be used to ensure that the airflow is directed appropriately.

The system 300 includes one or more blocker doors 328. With respect to the duct 320, the blocker door 328 may be hidden/concealed by the primary sleeve 302 when the thrust reverser is operated in the stowed state (e.g., during aircraft flight). Whereas FIG. 3A illustrates the system 300 when the thrust reverser is operated in the stowed state (e.g., during aircraft flight), FIG. 3B illustrates the system 300 when the thrust reverser is operated in the deployed state (e.g., during aircraft landing).

As shown in FIG. 3B, the system 300 may include one or more links 252, 354, and 356, which may be used to, e.g., stow or deploy the blocker door 328. More generally, a kinematic mechanism (which may include, for example, the links 252, 354, and 356) may be provided to control (e.g., stow or deploy) the blocker door 328.

The link 252, which may be referred to as an upper blocker door link, may be coupled to one or both of the links 354 and 356. For example, a first end 372-a of the link 252 may attach to a mid-point 376-a of the link 356, and an endpoint 372-b of the link 356 may attach to a first end 374-a of the link 354. The link 252 may be coupled (e.g., pivotally attached) to the cascade sleeve 304 at a second end 372-c of the link.

The link 354, which may be referred to as a trigger link, may be coupled to the link 356 (e.g., via attachment at the first end 374-a and the end-point 372-b). The link 354 may be coupled (e.g., pivotally attached) to fixed structure 364 at a second end 374-b of the link 354. The fixed structure 364 may include a clevis and an associated pin that may support the rotation/pivoting of the link 354. The pivoting or rotation of the link 354 may be controlled (based on a selection of one or more parameters, e.g., lengths of the links 252, 354 or 356) such that when the thrust reverser transitions from a stowed state (e.g., FIG. 3A) to a deployed state (e.g., FIG. 3B), the link 354 rotates in a single direction (e.g., clockwise in transitioning from FIG. 3A to FIG. 3B).

The link 356, which may be referred to as a lower blocker link, may be coupled to the link 252 (e.g., via attachment at the first end 372-a and the mid-point 376-a). The link 356 may be coupled to the blocker door 328 (e.g., via attachment at a second end 376-b of the link 356).

The blocker door 328 may be hinged to the translating cascade sleeve 304, as reflected via the reference character 378. Loads experienced by the blocker door 328 may be translated through the link 356 and the link 252 to the translating cascade sleeve 304 and the ribs 256 (see FIG. 2), and ultimately forward (fwd) and aft to structure.

In terms of a deployment of the thrust reverser of the system 300, in some embodiments the primary sleeve 302 may be translated (aft) first in order to create space or room for the deployment of the blocker door 328. Once the primary sleeve 302 is displaced, the actuator 314 may be engaged in order to cause the blocker door 328 to deploy (via the links and/or mechanisms described above).

Figure 4B:
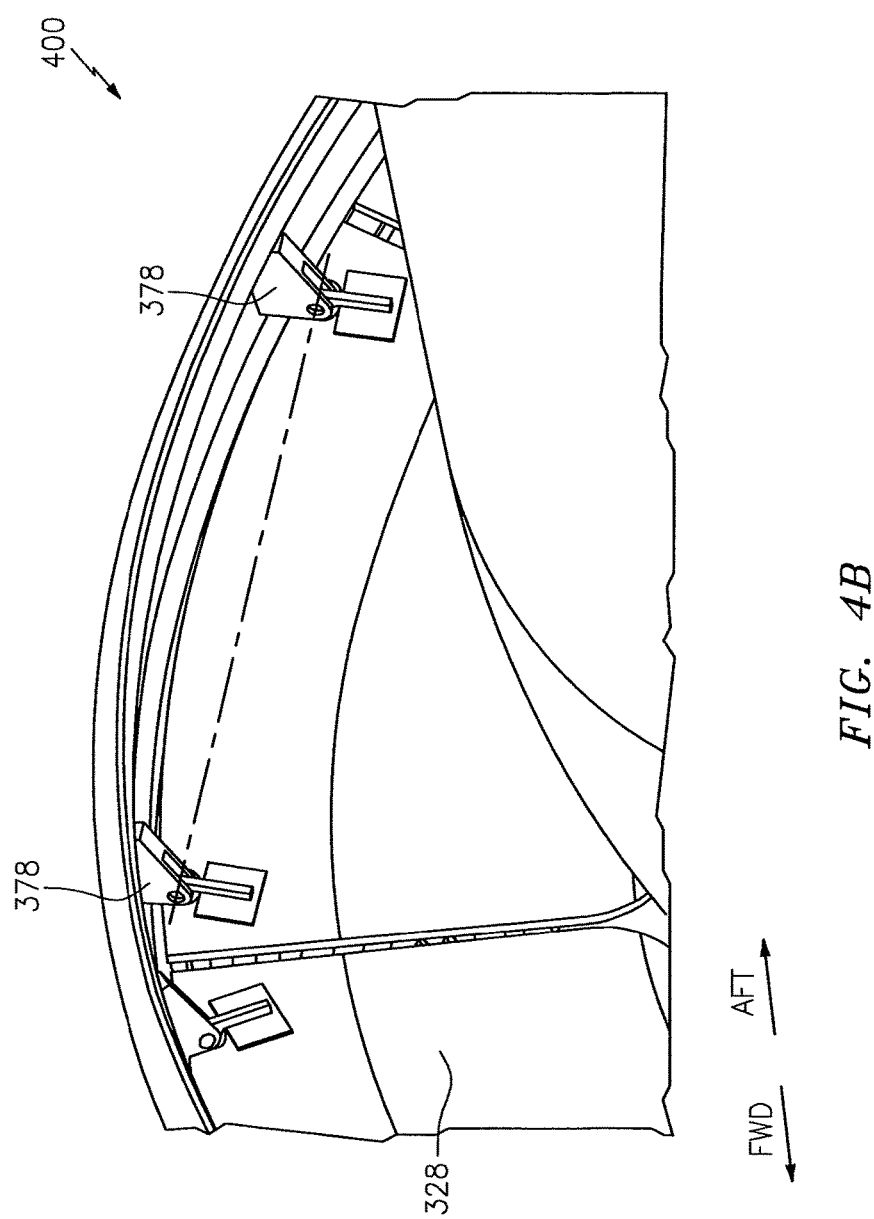

FIGS. 4A-4B show a perspective view (looking in a substantially forward (FWD) direction into the drawing figure pages) of a thrust reverser system 400 incorporating components of the systems 200 and 300. As shown in FIG. 4B, the blocker door 328 is hinged at the points 378. The motion of the door is rotation about a line formed via hinge locations 378. The hinge point 378 may include a clevis and a pin in some embodiments.

Technical effects and benefits of the disclosure include obtaining a maximum/increased efficiency in terms of engine operation/output by minimizing/reducing drag losses. Additionally, the size/profile of one or more components/devices (e.g., a translating sleeve) may be minimized/reduced, thereby reducing weight and allowing for better/different packaging options and shorter lines of travel than is available using conventional techniques. Furthermore, additional options for engine design/placement within a nacelle may be obtained due to a reduction in space that is consumed. In some embodiments, opportunities for customization or optimization may be provided given that a blocker door may be hidden/concealed from a duct by, e.g., a sleeve.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A thrust reverser system of an aircraft comprising:
   a fixed structure;
   a translating cascade sleeve configured to translate relative to the fixed structure;
   a blocker door; and
   a kinematic mechanism configured to actuate the blocker door, the kinematic mechanism comprising:
      an end of a first link pivotally attached to the translating cascade sleeve;
      a first end of a second link directly pivotally attached to a first end of the first link, and a second end of the second link pivotally attached to the fixed structure; and
      a first end of a third link directly pivotally attached to the first link, and a second end of the third link pivotally attached to the blocker door;
   a primary sleeve configured to conceal the blocker door with respect to a bypass duct airflow path when the thrust reverser system is in a stowed state, and wherein the primary sleeve is configured to translate relative to the translating cascade sleeve.

2. The thrust reverser system of claim 1, wherein the blocker door is hinged to the translating cascade sleeve.

3. The thrust reverser system of claim 1, wherein the first link passes through a set of cascades via a slot created through the cascades irrespective of whether the thrust reverser system is operated in the stowed state or a deployed state.

4. The thrust reverser system of claim 1, wherein loads experienced by the blocker door are translated through the third link and the first link to the translating cascade sleeve.

5. The thrust reverser system of claim 4, further comprising:
   a plurality of ribs,
   wherein the loads are translated from the translating cascade sleeve to the ribs in at least one of a forward direction or an aft direction.

6. The thrust reverser system of claim 1, wherein the fixed structure includes a clevis and a pin.

7. The thrust reverser system of claim 1, wherein the second link is configured to rotate in a single direction when the thrust reverser system transitions from the stowed state to a deployed state.

8. The thrust reverser system of claim 1, wherein the primary sleeve is configured to be actuated by a first actuation mechanism and wherein the translating cascade sleeve is configured to be actuated by a second actuation mechanism.

9. The thrust reverser system of claim 8, wherein, when the thrust reverser system is transitioning from the stowed state to a deployed state, the first actuation mechanism is configured to displace the primary sleeve before the second actuation mechanism causes an actuation of the translating cascade sleeve.

10. The thrust reverser system of claim 1, wherein the translating cascade sleeve is coupled to at least one of a hinge beam or a latch beam.

11. A thrust reverser system of an aircraft comprising:
   a fixed structure;
   a primary sleeve;
   a translating cascade sleeve configured to translate relative to the fixed structure, wherein the primary sleeve is configured to translate relative to the translating cascade sleeve;
   a blocker door; and
   a kinematic mechanism configured to actuate the blocker door, the kinematic mechanism comprising:
      a first link pivotally coupled to the translating cascade sleeve;
      a second link pivotally coupled to the first link and the fixed structure; and
      a third link pivotally coupled to the first link and the blocker door;
   wherein the primary sleeve is configured to conceal the blocker door with respect to a bypass duct airflow path when the thrust reverser system is in a stowed state.

12. The thrust reverser system of claim 11, wherein the blocker door is hinged to the translating cascade sleeve.

13. The thrust reverser system of claim 11, wherein the first link passes through a set of cascades via a slot created through the cascades irrespective of whether the thrust reverser system is operated in a stowed state or a deployed state.

14. The thrust reverser system of claim 11, wherein loads experienced by the blocker door are translated through the third link and the first link to the translating cascade sleeve.

15. The thrust reverser system of claim 14, further comprising:
   a plurality of ribs,
   wherein the loads are translated from the translating cascade sleeve to the ribs in at least one of a forward direction or an aft direction.

16. The thrust reverser system of claim 11, wherein the second link is configured to rotate in a single direction when the thrust reverser system transitions from a stowed state to a deployed state.

17. The thrust reverser system of claim 11, wherein the primary sleeve is configured to be actuated by a first actuation mechanism and wherein the translating cascade sleeve is configured to be actuated by a second actuation mechanism.

18. The thrust reverser system of claim 11,
- wherein an end of the first link is pivotally coupled to the translating cascade sleeve;
- a first end of the second link is pivotally coupled to the first link, and a second end of the second link is pivotally coupled to the fixed structure; and
- a first end of the third link is pivotally coupled to the first link, and a second end of the third link is pivotally coupled to the blocker door.

* * * * *